US010377632B2

(12) United States Patent
Gauthier et al.

(10) Patent No.: US 10,377,632 B2
(45) Date of Patent: Aug. 13, 2019

(54) PROCESSES FOR PRODUCING LIMXO₄ AND PRODUCTS THEREOF (71) Applicants: JOHNSON MATTHEY PUBLIC LIMITED COMPANY, London (GB); UNIVERSITÉ DE MONTRÉAL, Montreal (CA); LA CORPORATION DE L'ÉCOLE POLYTECHNIQUE DE MONTRÉAL, Montreal (CA)

(72) Inventors: Michel Gauthier, La Prairie (CA); Patrice Chartrand, Montreal (CA); Majid Talebi-Esfandarani, Montreal (CA); Pierre Sauriol, Mississauga (CA); Mickael Dollé, Montreal (CA); Jasmin Dufour, Lemoyne (CA); Guoxian Liang, St-Bruno-de-Montarville (CA)

(73) Assignees: JOHNSON MATTHEY PUBLIC LIMITED COMPANY, London (GB); UNIVERSITÉ DE MONTRÉAL, Montreal (CA); LA CORPORATION DE L'ÉCOLE POLYTECHNIQUE DE MONTRÉAL, Montreal (CA)

( * ) Notice: Subject to any disclaimer, the term of this patent is extended or adjusted under 35 U.S.C. 154(b) by 351 days.

(21) Appl. No.: 15/313,525

(22) PCT Filed: May 26, 2015

(86) PCT No.: PCT/CA2015/050474
§ 371 (c)(1),
(2) Date: Nov. 22, 2016

(87) PCT Pub. No.: WO2015/179972
PCT Pub. Date: Dec. 3, 2015

(65) Prior Publication Data
US 2017/0210624 A1 Jul. 27, 2017

Related U.S. Application Data (60) Provisional application No. 62/002,958, filed on May 26, 2014.

(51) Int. Cl.
*C01B 25/00* (2006.01)
*C01B 25/45* (2006.01)
*H01M 4/58* (2010.01)
*H01M 4/04* (2006.01)
*H01M 4/136* (2010.01)
*H01M 4/36* (2006.01)

(52) U.S. Cl.
CPC .......... *C01B 25/45* (2013.01); *H01M 4/0471* (2013.01); *H01M 4/136* (2013.01); *H01M 4/366* (2013.01); *H01M 4/5825* (2013.01); *C01P 2006/40* (2013.01)

(58) Field of Classification Search
CPC ...... C01B 25/45; C01B 25/30; H01M 4/0471; H01M 4/136; H01M 4/366; H01M 4/5825
USPC ........................................................ 423/306
See application file for complete search history.

(56) References Cited

U.S. PATENT DOCUMENTS

| 7,534,408 | B2 * | 5/2009 | Gauthier | ................. C01B 25/37 423/306 |
| 8,075,861 | B2 | 12/2011 | Tian et al. | |
| 2004/0086445 | A1 | 5/2004 | Armand et al. | |
| 2004/0151649 | A1 | 8/2004 | Hemmer et al. | |
| 2015/0118560 | A1 * | 4/2015 | Ewald | ................. H01M 4/131 429/221 |
| 2015/0118561 | A1 * | 4/2015 | Gauthier | ................. C01B 25/45 429/221 |

FOREIGN PATENT DOCUMENTS

| CA | 2510880 | 1/2007 |
| CA | 2949305 | 12/2015 |
| CN | 101348243 | 1/2009 |
| CN | 102027939 | 4/2011 |
| CN | 102208620 | 10/2011 |
| CN | 102891316 | 1/2013 |
| EP | 3148931 | 4/2017 |
| WO | WO02/27823 | 4/2002 |
| WO | WO2005/062404 | 7/2005 |
| WO | WO2013/177671 | 12/2013 |

OTHER PUBLICATIONS

International Preliminary Report on Patentability for PCT/CA2015/050474 (dated Dec. 8, 2016).
International Search Report for PCT/CA2015/050474 (dated Aug. 14, 2015).
Written Opinion for PCT/CA2015/050474 (dated Aug. 14, 2015).
Bale, C.W. et al., "FactSage Thermochemical Software and Databases," *Calphad Journal*, 26(2):189-228 (Jun. 2002).

(Continued)

*Primary Examiner* — Steven J Bos
(74) *Attorney, Agent, or Firm* — Klarquist Sparkman, LLP (57) ABSTRACT There is provided a process for producing LiMXO₄, comprising the steps of reacting a source of lithium, a source of M, and a source of X together, in a melted state at a reaction temperature between 900 to 1450 C, in the presence of an excess of (A) a solid-solid reducing couple having an oxygen partial process at equilibrium (pO₂) comprised between $10^{-8}$ and $10^{-15}$ atm at said reaction temperature according to an Ellingham-Richardson diagram for oxides, or (B) one component of the solid-solid reducing couple together with a gas-gas reducing couple having an oxygen partial pressure equilibrium (pO₂) between $10^{-8}$ and $10^{-15}$ atm at said reaction temperature according to an Ellingham-Richardson diagram of oxides, and under thermic equilibrium and thermodynamic equilibrium. There is also provided a LiMXO₄ melt-solidified product free from off-composition impurities.

17 Claims, 5 Drawing Sheets (56) References Cited

OTHER PUBLICATIONS

Bale. C. W. et al., "FactSage thermochemical software and databases—recent developments," *Calphad*, 33(2):295-311 (Jun. 2009).
Jak, E. et al., "Thermodynamic optimisation of the $FeO$—$Fe_2O_3$—$SiO_2$ (Fe—O—Si) system with FactSage," *International Journal of Materials Research*, 98(9):847-854 (Sep. 2007).

\* cited by examiner

PROCESSES FOR PRODUCING LIMXO₄ AND PRODUCTS THEREOF

CROSS REFERENCE TO RELATED APPLICATIONS

This is the U.S. National Stage of International Patent Application No. PCT/CA2015/050474, filed May 26, 2015, which was published in English under PCT Article 21(2), which in turn claims benefit, under 35 U.S.C § 119(e), of U.S. provisional application Ser. No. 62/002,958, filed on May 26, 2014. All documents above are incorporated herein in their entirety by reference.

FIELD OF THE INVENTION

The present invention relates to a process for producing LiMXO$_4$ and products thereof. More specifically, the present invention is concerned with such a process wherein the reduction conditions are controlled and to a melt-solidified product tee from off-composition impurities.

BACKGROUND OF THE INVENTION

Lithium iron phosphate, LiFePO$_4$ (LFP), is the main representative of a family of LiFe(M)XO$_4$ compounds having the olivine structure capable to insert and de-insert Li+ ion when used in a cathode of a lithium battery.

Several processes have been described to make electrochemically active LiFePO$_4$ or partially substituted LiFePO$_4$. In fact, most of such processes allow to make LFP that is more or less substituted by replacing part of the Fe by other metals such as Mn or Mg or by replacing part of the P by another oxyanion forming element such as S, Si, B, Mo or V for example to give: LiFe(M)XO$_4$.

Known processes include solid-state reactions of finely dispersed reactants (WO 02/27823 A1) as wee as solvent assisted precipitation of LiFePO$_4$ (US 2004/0151649 A1). The solid-state process leads to a product that contains secondary phases (such as Fe$_3$P, Fe$_2$P, FeP, LiPO$_3$, Li$_4$P$_2$O$_7$, Fe$_2$P$_2$O$_7$, Li$_3$Fe$_2$(PO$_4$)$_3$, etc.) or dispersed Fe$_2$O$_3$ depending of the reducing conditions, temperature, reactants excess to stoichiometric proportions or reactant dispersion quality. The product obtained by solvent assisted precipitation contains structural defects or other off-composition defects depending on the operating conditions.

Synthesis in the molten state has also been described (WO 2005/062404 A1, further refined in WO 2013/177671 A1). This melt process uses precursors that are more commonly available commercially. This molten process is rapid and not reactant specific since in the molten state and under strongly reducing conditions (in the presence of C, CO or H$_2$). LiFePO$_4$ can be obtained and crystallized upon cooing. This process has been shown to lead to electrochemically active LiFePO$_4$ cathode powder when reduced to powder; but minor components are present, such as Fe$_3$P, Fe$_2$P, FeP, LiPO$_3$, Li$_4$P$_2$O$_7$, Fe$_2$P$_2$O$_7$, Li$_3$Fe$_2$(PO$_4$)$_3$, etc.

Some of these off-composition phases (for example Fe$_2$O$_3$, Fe$_2$P or LiPO$_3$) are undesirable as they can be detrimental to the cycling properties of the overall battery. They cannot be eliminated or controlled with the existing processes.

SUMMARY OF THE INVENTION

In accordance with the present invention, there is provided:

1. A process for producing LiMXO$_4$,
    wherein M is a transition metal with a degree of oxidation of 2+ chosen from Fe$^{2+}$, Mn$^{2+}$ and mixtures thereof, unsubstituted or partially substituted on iron or manganese sites by one or more additional metal with a degree of oxidation of 1+ to 5+, and
    X is P$^{5+}$, unsubstituted or partially substituted by an oxyanion forming element,
    the process composing the steps of:
    a) providing a source of lithium, a source of M, and a source of X,
    b) reacting the source of lithium, the source of M, and the source of X together:
        i. in a melted state at a reaction temperature between 900 to 1450° C.,
        ii. in the presence of an excess of:
            (A) a solid-solid reducing couple having an oxygen partial pressure at equilibrium (pO$_2$) comprised between 10$^{-8}$ and 10$^{-15}$ atm at said reaction temperature according to an Ellingham-Richardson diagram for oxides, or
            (B) one component of said solid-solid reducing couple together with a gas-gas reducing couple having an oxygen partial pressure at equilibrium (pO$_2$) comprised between 10$^{-8}$ and 10$^{-15}$ atm at said reaction temperature according to an Ellingham-Richardson diagram for oxides, and
        iii. under thermic equilibrium and thermodynamic equilibrium,
        thereby producing molten LiMXO$_4$,
    c) isolating the LiMXO$_4$ from the reducing couple,
    d) solidifying the LiMXO$_4$ and
    wherein step c) can be carried out before and/or after step d).

2. The process of item 1, wherein the reaction temperature is between 950 and 1250° C.

3. The process of item 1 or 2, wherein the source of lithium, the source of M and the source of X comprise LiMXO$_4$.

4. The process of any one of items 1 to 3, wherein the source of lithium comprises LiPO$_3$, Li$_2$CO$_3$, LiOH, Li$_3$PO$_4$, Li$_4$P$_2$O$_7$, LiH$_2$PO$_4$, or Li$_2$HPO$_4$, or a mixture thereof.

5. The process of any one of items 1 to 4, wherein M is unsubstituted or partially substituted Mn$^{2+}$.

6. The process of any one of items 1 to 4, wherein M is unsubstituted or partially substituted Fe$^{2+}$.

7. The process of any one of items 1 to 6, wherein the additional metal is one or more of Mg, Ca, Al, V, Mo, Nb, Ti, Zr, Ni, Co, or Cr.

8. The process of any one of items 1 to 4, wherein M is unsubstituted Fe$^{2+}$.

9. The process of any one of items 6 to 8, where the source of M comprises a natural mineral of iron, an iron oxide, an iron phosphate, or iron metal, and mixtures thereof.

10. The process of item 9, wherein the natural mineral of iron comprises a natural mineral of iron oxide or a natural mineral concentrate with a global (Fe$^{+3}$, Fe$^{+2}$)O$_x$ composition in which x varies between 1.5 and ~1.

11. The process of any one of items 1 to 10, wherein the oxyanion forming element is one or more of S, Si, B, Mo and V, preferably Si.

12. The process of any one of items 1 to 10, wherein X is unsubstituted P$^{5+}$.

13. The process of any one of items 1 to 12, wherein the source of X comprises H$_3$PO$_4$, an ammonium phosphate, LiH$_2$PO$_4$, Li$_2$HPO$_4$, P$_2$O$_5$, LiPO$_3$, Li$_3$PO$_4$, or a mixture thereof.

14. The process of any one of items 1 to 13, wherein the source of lithium and the source of X comprises $LiPO_3$ or a precursor thereof.
15. The process of any one of items 1 to 14, wherein step b) is carried out in the presence of kinetically slow C, such as graphite.
16. The process of any one of items 1 to 15, wherein step b) is carried out in a crucible made of nickel metal iron metal, magnesia, calcia, alumina or zirconia ceramics, graphite, clay graphite, or SIC.
17. The process of any one of items 1 to 14, wherein step b) is carried out in the absence of strongly reducing moieties.
18. The process of item 17, wherein step b) is carried out in the absence of C, said C having a $pO_2$ between $10^{-16}$ et $10^{-20}$ atm at the reaction temperature.
19. The process of any one of items 1 to 18, wherein, step b) is carried out in a pool of melted $LiMXO_4$ as a reaction media.
20. The process of any one of items 1 to 19, wherein, in step b), the source of lithium, the source of M, and the source of X are melted separately before being put in the presence of the reducing couple.
21. The process of any one of items 1 to 19, wherein, in step b), the source of lithium, the source of M, and the source of X are melted together in the presence of the reducing couple.
22. The process of any one of items 1 to 21, wherein the source of lithium, the source of M, the source of X and the reducing couple are mechanically stirred during step b).
23. The process of any one of items 1 to 22, wherein the source of lithium, the source of M, and the source of X are stirred during step b) by bubbling the gas-gas reducing couple through the source of lithium, the source of M, and the source of X in melted state.
24. The process of any one of items 1 to 23, wherein the solid-solid reducing couple comprises a solid-solid $Fe^0$/FeO reducing couple and the reaction temperature is between 950 to 1400° C.
25. The process of item 24, wherein the $Fe^0$ is one or more of an iron powder, atomized iron droplets, pieces or rods of iron or an iron crucible containing the source of lithium, the source of M, and the source of X.
26. The process of any one of items 1 to 25, wherein the solid-solid reducing couple comprises a solid-solid FeO/$Fe_3O_4$ reducing couple and the reaction temperature is between 950 to 1350° C.
27. The process of any one of items 24 to 26, wherein the FeO is produced in-situ from an iron source.
28. The process of item 27, wherein the iron source is a natural mineral concentrate with a global $(Fe^{+3}, Fe^{+2})O_x$ composition in which x varies between 1.5 and ~1.
29. The process of any one of items 1 to 28, wherein step b) carried out in the presence of (A) said solid-solid reducing couple.
30. The process of item 29, wherein step b) is also carried out in the presence of a gas-gas reducing couple.
31. The process of any one of items 1 to 28, wherein step b) carried out in the presence of (B) one component of the solid-solid reducing couple together with the gas-gas reducing couple.
32. The process of item 31, wherein the component is FeO.
33. The process of any one of items 1 to 32, wherein the gas-gas reducing couple comprises $H_2/H_2O$ and the reaction temperature is between 950 to 1400° C.
34. The process of item 33, wherein the volumetric ratio of each of $H_2$ and $H_2O$ is between 5 and 95%.
35. The process of any one of items 1 to 34, wherein the gas-gas reducing couple comprises $CO/CO_2$ and the reaction temperature is between 950 to 1400° C.
36. The process of item 35, wherein the volumetric ratio of each of CO and $CO_2$ is between 5 and 95%.
37. The process of any one of Items 33 to 36, wherein the reducing couple is syngas.
38. The process of any one of Items 1 to 37, wherein the molten $LiMXO_4$ is degassed before solidification of the $LiMXO_4$ in step d).
39. The process of any one of items 1 to 38, wherein in step c), the molten $LiMXO_4$ is isolated from the solid-solid reducing couple by decantation, filtration, or magnetic separation, before solidification of the $LiMXO_4$ in step d).
40. The process of any one of items 1 to 39, wherein in step c), the molten $LiMXO_4$ is isolated from the gas-gas reducing couple by degassing, before solidification of the $LiMXO_4$ in step d).
41. The process of any one of items 1 to 40, wherein step d) comprises solidification of the $LiMXO_4$ by casting or atomization.
42. The process of any one of items 1 to 41, further comprising step e) of comminuting the $LiMXO_4$,
    wherein step e) is carried out after solidification of the $LiMXO_4$ in step d),
    with the proviso that if step c) isolating the $LiMXO_4$ from the reducing couple is carried out after said step d), ten step e) comminuting is carried out before step c).
43. The process of item 42, wherein in step c), the $LiMXO_4$ is isolated from the solid-solid reducing couple by magnetic separation after steps d) and e).
44. A melt-solidified product comprising $LiMXO_4$, wherein M and X are as defined in any one of items 1, 5-8, and 11-12, the product being free from off-composition impurities.
45. The product of items 44, wherein $LiMXO_4$ is $LiFeXO_4$ free from the following off-composition impurities are:
    $Fe^0$,
    $Fe^{3+}$ phases,
    oxidized or reduced iron phosphides,
    oxidized or reduced iron oxides,
    oxidized or reduced iron phosphates,
    oxidized or reduced lithium phosphates, except for minor amounts of $LiPO_3$, $LiPO_4$ and $Li_4P_2O_7$,
    oxidized or reduced lithium iron phosphate, such as $Li_3Fe_2(PO_4)$,
    oxidized or reduced lithium iron oxides, and
    oxidized or reduced lithium iron phosphides.
46. The product of item 44 or 45, comprising at most about 5% molar ratio of $Li_3PO_4$.
47. The product of item 46, being free from $Li_3PO_4$.
48. The product of any one of items 44 to 47, comprising at most about 5% molar ratio of $Li_4P_2O_7$.
49. The product of item 48, being free from $Li_4P_2O_7$.
50. The product of any one of items 44 to 49, comprising at most about 5% molar ratio of $LiPO_3$.
51. The product of item 50, being free from $LiPO_3$.
52. The product of any one of items 44 to 51, comprising at most about 5% (w/w) extraneous impurities.
53. The product of item 52, being free of extraneous impurities.
54. The product of item 44 consisting of $LiMXO_4$, at most about 5% molar ratio of $LiPO_4$, at most about 5% molar ratio of $Li_4P_2O_7$, at most about 5% molar ratio of $LiPO_3$, and at most about 5% (w/w) extraneous impurities.
55. The product of any one of items 44 to 54 produced by the process of any one of items 1 to 43.

BRIEF DESCRIPTION OF THE DRAWINGS

In the appended drawings.

DETAILED DESCRIPTION OF THE INVENTION

Process for Producing LiMXO$_4$

Turning now to the Invention in more details, there is provided a process for producing LiMXO$_4$. The present process is a melt process. In some senses, it can be conceived as an improvement of the processes described in WO 2005/062404 A1 and WO 2013/177671 A1.

LiMXO$_4$ represents a family of compounds having an divine structure capable to insert and de-insert Li+ ion when used in a cathode of a lithium battery. Thus, in embodiment, the process of the invention is a process for making LiMXO$_4$ for use as a cathode material. For such use, the LiMXO$_4$ is processed as well-known in the art. Such process typically includes comminuting and coating with a layer of carbon, which produces a material suitable for use in a cathode. International patent applications WO 2005/062404 A1 and WO 2013/177671 provide details of such process.

In LiMXO$_4$, M is a transition metal with a degree of oxidation of 2+ chosen tom Fe$^{2+}$, Mn$^{2+}$ and mixtures thereof. In M, part of the Fe$^{2+}$ and/or Mn$^{2+}$ can be substituted on the iron or manganese sites by one or more additional metal with a degree of oxidation of 1+ to 5+. In embodiments, at most about 10% (molar ratio), preferably at most about 5% of the Fe$^{2+}$ and/or Mn$^{2+}$ is substituted by such additional metals. In preferred embodiments. Fe$^{2+}$ and/or Mn$^{2+}$ are unsubstituted. In preferred embodiments, M is Fe$^{2+}$. Non-limiting example of additional metals include Mg, Ca, Al, V, Mo, Nb, Ti, Zr, Ni, Co, and Cr.

In LiMXO$_4$, X is P$^{5+}$. Part of the P$^{5+}$ can be substituted by an oxyanion forming element. In embodiments, at most about 10% (molar ratio), preferably at most about 5% of the P$^{5+}$ is substituted by such elements. In preferred embodiments, P$^{5+}$ is unsubstituted. Non-limiting example of oxyanion forming elements include S, Si, B, Mo and V.

It will be apparent to the skilled person that LiMXO$_4$ has a neutral charge. Therefore, when Fe$^{2+}$, Mn$^{2+}$, or P$^{5+}$ is partly substituted by an atom with different a different charge, this change this would create in the total charge of the compound must be compensated, possibly via substitutions with other elements. For example, a common oxyanion forming element is Si, which can be found, for example, as SiO$_2$ in minerals used as starting materials in the present process. Si in such cases has a 4+ charge. This is one fewer positive charge than P$^{5+}$. To compensate for the lack of positive charges this creates, another substitution can be present. For example, the Fe$^{2+}$ and/or Mn$^{2+}$ can be substituted by metals having a higher positive charge.

More information on the LiMXO$_4$ produced by the present process, including its impurities, is provided in the section entitled "Melt-Solidified Product Comprising LiMXO$_4$" below.

Step a)

The process of the invention first comprises the step of providing a source of lithium, a source of M, and a source of X.

Many sources of lithium can be used with the process of the invention. Non-limiting examples include LiPO$_3$, Li$_2$CO$_3$, LiOH, Li$_3$PO$_4$, Li$_4$P$_2$O$_7$, LiH$_2$PO$_4$, and Li$_2$HPO$_4$ as well as mixtures thereof.

Similarly, many sources of X can be used. Non-limiting examples include H$_3$PO$_4$, P$_2$O$_6$, NH$_4$H$_2$PO$_4$, (NH$_4$)$_2$HPO$_4$, LiPO$_3$, Li$_3$PO$_4$, Li$_4$P$_2$O$_7$, LiH$_2$PO$_4$, and Li$_2$HPO$_4$ as well as mixtures thereof. When part of the P$^{5+}$ in X is substituted by one or more oxyanion forming elements (e g. S, Si, B, Mo and V), the source of X will further comprise a source of such elements. Non-limiting examples of sources for these elements include SiO$_x$, SO$_x$, BO$_x$, MoO$_x$, VO$_x$.

In preferred embodiments, lithium and P$^{5+}$ are provided in a same source. Preferably, LiPO$_3$ can be used as the source of both lithium and P$^{5+}$. In such embodiments, the LiPO$_3$ can be made in advance or can be generated in-situ by heating suitable precursors, such as LiH$_2$PO$_4$, (NH$_4$)H$_2$PO$_4$+½Li$_2$CO$_3$, (NH$_4$)$_2$HPO$_4$+½Li$_2$CO$_3$, and Li$_3$PO$_4$+2NH$_4$H$_2$PO$_4$. One advantage of using LiPO$_3$ is that it contains lithium and P$^{5+}$ in a fixed Li/P$^{5+}$ molar ratio of 1:1. Also, it does not generate gases and totally reacts with FeO (in excess—when a Fe$^0$/FeO reducing couple is used) during synthesis. The chemical bond between lithium and P$^{5+}$ in LiPO$_3$ avoids the formation of lithium deficient off-composition defects, such as Fe$_2$P$_2$O$_7$, and allows the direct formation reaction without gas generation:

LiPO$_3$+FeO (in excess)+Fe° (in excess)=>LiFePO$_4$+ FeO (in excess)+Fe° (in excess).

When M is Fe$^{2+}$, the source of M can be, for example one or more of:
- a natural mineral of iron, for example:
  - a natural mineral of iron oxide (for example hematite (Fe$_2$O$_3$), magnetite (Fe$_3$O$_4$), goethite (FeO(OH)), limonite (FeO(OH).n(H$_2$O)) or siderite (FeCO$_3$), al of which can advantageously be concentrated and purified by standard mineral enrichment process before their use in the process of the invention, or
  - a natural mineral concentrate with a global (Fe$^{+3}$, Fe$^{+2}$)Ox composition in which x varies between 1.5 and ~1,
- an iron oxide,
- an iron phosphate, or
- iron metal.

When M is Mn$^{2+}$, the source of M can be, for example, MnO$_2$ and MnO.

When part of the Fe$^{2+}$ and/or Mn$^{2+}$ is substituted by one or more additional metal with a degree of oxidation of 1+ to 5+, the source of M will further comprise a source of such metals. The nature of these is not crucial as long as it will not be reduced to metal (0 degree of oxidation) during the reaction to form LiMXO$_4$. Non-limiting examples of sources for these metals include their oxides, carbonates, phosphates or organometallics.

As discussed above, lithium and P$^{5+}$ are advantageously provided in a stoichiometric amount (1:1 molar ratio). In general, an excess of Fe$^{2+}$ and/or Mn$^{2+}$ will be provided so that all of the Li and P$^{5+}$ will react. Indeed, an excess of Li and P, typically result in a secondary phases whose composition varies from $LiPO_3$ to $Li_4P_2O_7$ to $Li_3PO_4$.

In embodiments, the source of lithium, the source of M, and the source of X are $LiMXO_4$ or are as defined above but also comprise $LiMXO_4$. In embodiments, the source of lithium, the source of M, and the source of X are $LiMXO_4$. These embodiments are useful for the recycling of $LiMXO_4$ cathodes.

Step b)

The second step of the process of the invention is the reaction of the source of lithium, the source of M, and the source of X together
  i. in a melted state at a reaction temperature between 900 to 14500° C.,
  ii. in the presence of an excess of
    (A) a solid-solid reducing couple having an oxygen partial pressure at equilibrium (pO2) comprised between $10^{-8}$ and $10^{-15}$ atm at said reaction temperature according to an Ellingham-Richardson diagram for oxides, or
    (B) one component of the solid-solid reducing couple together with a gas-gas reducing couple having an oxygen partial pressure at equilibrium (pO2) comprised between $10^{-8}$ and $10^{-15}$ atm at said reaction temperature according to an Ellingham-Richardson diagram for oxides, and
  iii. under thermic equilibrium and thermodynamic equilibrium,
which produces molten $LiMXO_4$.

The process of the invention is indeed a melt process in which the reactants (the source of lithium, the source of M, and the source of X) are reacted in their molten state, which produces molten $LiMXO_4$.

The reaction temperature is between 900 to 1450° C., preferably between 950 to 1400° C. more preferably between 950 and 1250° C. This temperature is high enough to melt the reactants and product, while low enough to avoid thermodegradation.

The source of lithium, the source of M, and the source of X together are reacted in the presence of an excess of a solid-solid reducing couple or one component of the solid-solid reducing couple together with a gas-gas reducing couple.

Herein, a "reducing couple" is an element or an oxide of an element, together with a further oxidized from of said element or oxide, for example:
  $Fe^0$ (an element) together with FeO (a further oxidized form of this element), or
  FeO (an oxide of an element) together with $Fe_3O_4$ (a further oxidized form of this oxide).
A solid-solid reducing couple is solid at the reaction temperature, while the gas-gas reducing couple is gaseous at that temperature, in some embodiments, both solid-solid and gas-gas reducing couple are used during the synthesis.

An "excess of" such reducing couple means that when one element of the reducing couple is consumed during the synthesis, it is present in excess of the stoichiometry of the final product ($LiMXO_4$). In other words, after the reaction reached equilibrium, both elements of the reducing couple will preferably remain.

In embodiments, a gas-gas reducing couple can be used in addition to the solid-solid reducing couple. In such embodiments, in particular where the $Fe^°/FeO$ reducing couple is used, only FeO excess might be present after the reaction reached equilibrium. This is one optional embodiment when an iron oxide mineral is used for the synthesis.

In other embodiments, only one solid element of the solid-solid reducing couple, especially FeO, is used along the gas-gas reducing couple. In this later case, the FeO present will contribute to avoid too reducing condition while consuming any $LiPO_3$ reactant present after the reaction reached equilibrium.

The reducing couple of the invention has an oxygen partial pressure at equilibrium ($pO_2$) comprised between $10^{-8}$ and $10^{-15}$ as atm at the reaction temperature according to an Ellingham-Richardson diagram for oxides.

Ellingham diagrams (or Ellingham-Richardson diagrams) are well known from the skilled person. They are a particular graphical form of the principle that the thermodynamic feasibility of a reaction depends on the sign of $\Delta G$, the Gibbs free energy change, which is equal to $\Delta H - T\Delta S$, where $\Delta H$ is the enthalpy change and $\Delta S$ is the entropy change. The Ellingham diagram plots the Gibbs free energy change ($\Delta G$) for each oxidation reaction as a function of temperature. For comparison of different reactions, all values of $\Delta G$ refer to the reaction of the same quantity of oxygen. In other words, allows evaluating the ease of reduction of metal oxides. They are used to predict the equilibrium temperature between a metal, its oxide, and oxygen.

Figure 1:
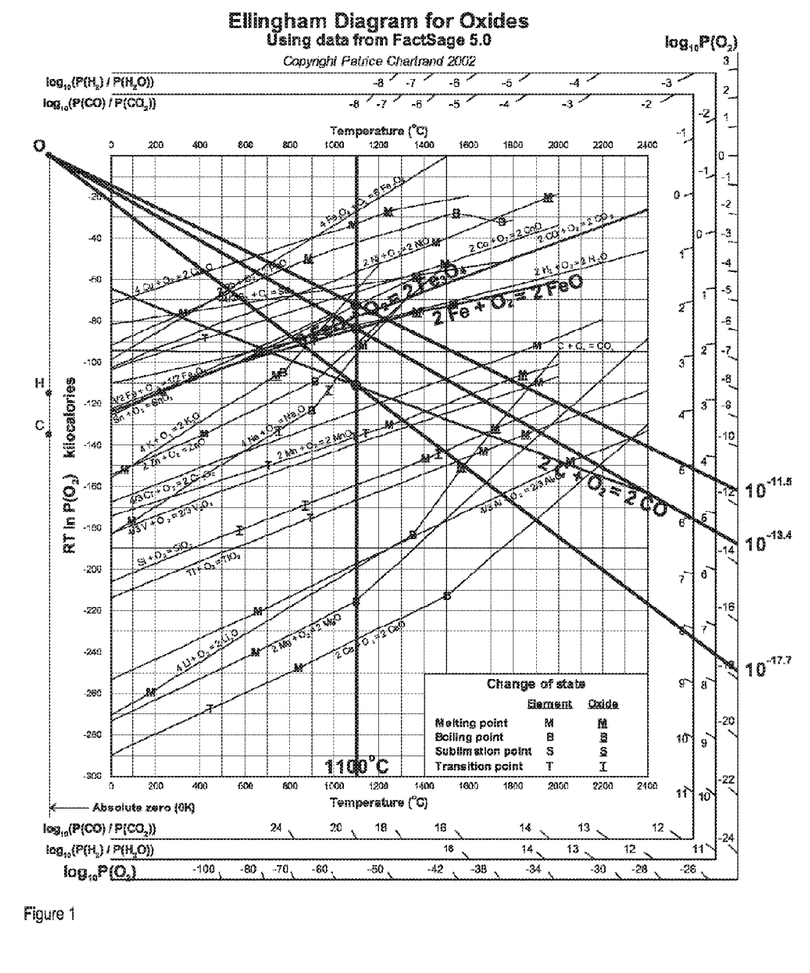
FIG. 1 is a calculated Ellingham-Richardson Diagram for Oxides together with projections for the Fe/FeO, C/CO and FeO/Fe$_3$O$_4$ lines.

FIG. 1 is an Ellingham-Richardson diagram calculated for several oxides. This diagram was calculated using FACT 5.0 Pure Substance Database with the FactSage Thermochemical Software Package. Documentation on this software package is available from: C. W. Bale, P. Chartrand, S. A. Decterov, G. Eriksson, K. Hack, R. Ben Mahfoud, J. Melançon, A. D. Pelton and S. Petersen, "FactSage Thermochemical Software and Databases", Calphad Journal, 62, 189-228 (2002).

Also, included or the figure are the projections for the Fe/FeO, C/CO and $FeO/Fe_3O_4$ lines to evaluate their oxygen partial pressures at equilibrium ($pO_2$) at 110° C. This $pO_2$ value is a measure of the reducing conditions of each of these couples.

The presence of the reducing couple in excess allows controlling the reducing conditions during the reaction. This reduces the production of off-composition impurities resulting from the lack of control of the reducing conditions in which well-defined pure $LiMXO_4$ is formed. Indeed, the present process takes advantage of the equilibrium between the molten $LiMXO_4$ (for example $LiFePO_4$) phase and at least another pair of solid-solid or gas-gas phases (the reducing couple), which acts as a "buffer" that maintain the reducing condition (e.g. $pO_2$ equivalent) at equilibrium in a narrow window favorable of the formation of $LiMXO_4$ rather than undesirable impurities. For example, a solid-solid couple, such as $Fe^°/FeO$, fixes rapidly a local $pO_2$ atmosphere (as can be seen in FIG. 1) that is reductive enough in the temperature range of the invention to form pure $LiMXO_4$. At too reducing $pO_2$ atmosphere, such as that defined for example by the C/CO couple, will generate 'reduced' off-composition impurities. On the other hand, a too oxidizing $pO_2$ atmosphere will generate 'oxidized' off-composition impurities, such as $Fe_2O_3$ and $Li_3Fe_2(PO_4)_3$. All these impurities are avoided here as will be described in further details in the section entitled "Melt-Solidified Product Comprising $LiMXO_4$" below.

As also discussed in detail below, the gas-gas $H_2/H_2O$ and $CO/CO_2$ couples can contribute to the fixation of the $pO_2$ required for the $LiMXO_4$ in the temperature range of the present invention. In preferred embodiments, either of both of these gas-gas reducing couple is used in conjunction with a solid-solid reducing couple, especially, $Fe^°/FeO$, or at least the solid FeO element of the couple.

It should also be noted that such control over the reducing conditions is obtained when the reaction mixture is at equilibrium with any of the reducing couple in the temperature range of the invention At such high temperatures, the heat transfer is fast and the sources of lithium, M, and X can rapidly achieve thermic equilibrium and thermodynamic equilibrium. In other words, the reactions are rapid and continued until they reach thermic equilibrium and thermodynamic equilibrium.

In embodiments, the reaction is carried out in a pool of melted $LiMXO_4$ as the reaction media. In preferred embodiments, the sources of lithium, M, and X are simply added, separately or mixed together, in powder or granular forms, to this pool. Such embodiments have the advantage of rapidly heating the reactants at the reaction temperature by rapid homogenisation and heat transfer and allowing rapid shorter reaction time and quicker attainment of thermodynamic equilibrium in a continuous or semi-continuous process of reacting and casting.

In embodiments, the sources of lithium, M, and X are melted separately before being put in the presence of the reducing couple.

In embodiments, the sources of lithium, M, and X are melted together in the presence of the reducing couple.

In embodiments, the sources of lithium, M, and X and the reducing couple are mechanically stirred during step b). This is particularly valuable when a solid-solid reducing couple is used. In embodiments where a gas-gas reducing couple is used, the source of lithium, the source of M, and the source of X can also be stirred during step b) by bubbling the gas-gas reducing couple through them (which is possible since they are molten). Also, both types of stirring can be present simultaneously.

$Fe^0(s)/FeO(s)$

In preferred embodiments, the reducing couple is $Fe^0(s)/FeO(s)$, which has a $pO_2$ between $10^{-10}$ and $10^{-15}$ atm at a reaction temperature between 950 to 1400° C. When used in excess, this reducing couple provides "mild" reducing conditions at equilibrium.

These mild reducing conditions can be visualized and determined using the Ellingham-Richardson diagram for oxides of FIG. 1. For example, one can compare the reducing conditions at equilibrium of the $Fe^0(s)/FeO(s)$ couple with the strongly reducing $C(s)/CO(g)$ couple at 1100° C.:

$$pO_2(Fe^0/FeO)=1.1\times10^{-14} \text{ atm. (mild reducing condition)}$$

$$pO_2(C/CO)=1.6\times10^{-18} \text{ atm. (strong reducing condition)}$$

Mild reducing conditions in the context of the present invention means oxygen partial pressure ($pO_2$) comprised in the range of $10^{-10}$ to $10^{-14}$ atm when the melt temperature is about 1100° C. or equivalent, or $pO_2$ of $10^{-8}$ to $10^{-14}$ atm when the temperature ranges between 950° C. and 1400° C. as defined in the Ellingham diagram of FIG. 1.

The "mild" reducing conditions provided by the ($Fe^o$/FeO) couple are sufficient to reduce any $Fe^{+3}$ present to $Fe^{+2}$ in the molten phase, while avoiding the strongly reducing condition of the C/CO couple favorable to FeP, $Fe_2P$, $Fe_3P$ or $Fe_2P_2O_7$ formation. The result is a purer product exempt of off-composition defects resulting from overly oxidizing or overly reducing conditions.

Figure 2:
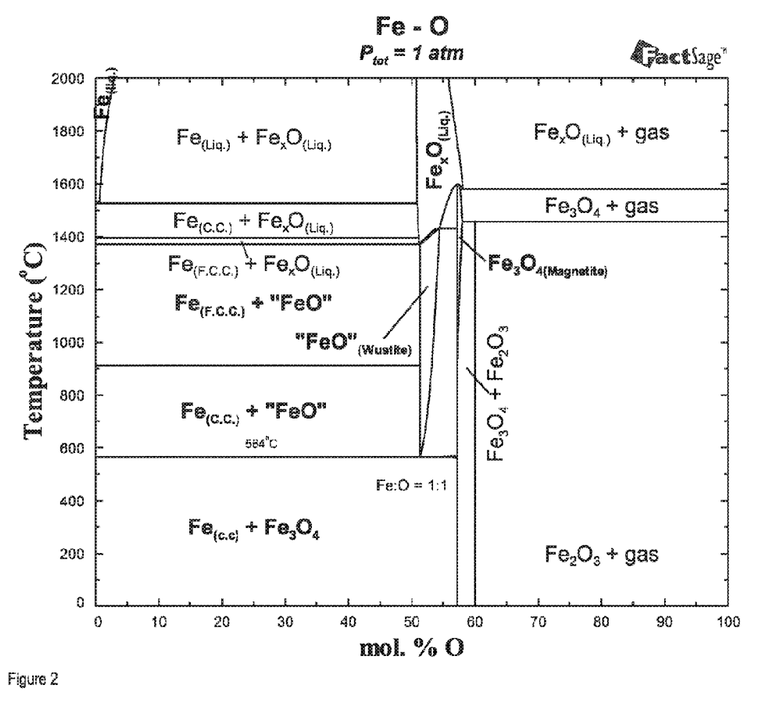
FIG. 2 is Calculated T-X(O) equilibrium phase diagram of the Fe—O system at 1 atm.
Figure 3:
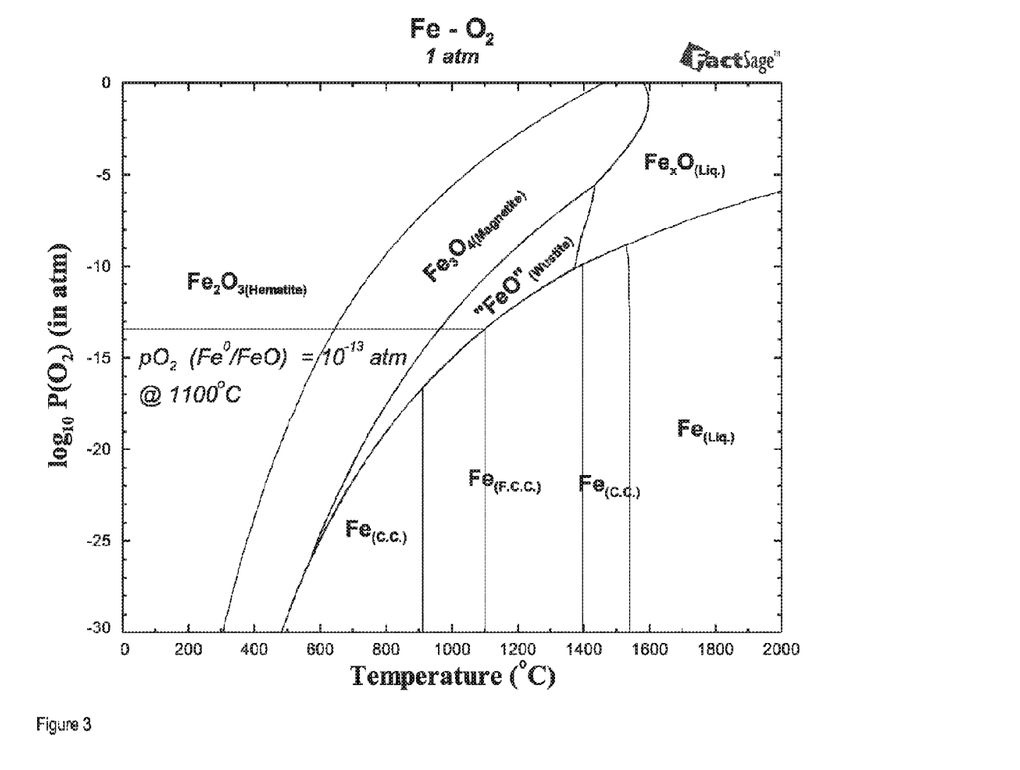
FIG. 3 is Calculated T-log P(O$_2$) equilibrium phase diagram of the Fe—O system at 1 atm.

FIG. 2 and FIG. 3, like FIG. 1, were calculated using the FACT 5.0 Pure Substance Database with the FactSage Thermochemical Software. More specifically, they respectively show the T-X(O) and T-log $P(O_2)$ equilibrium phase diagrams of the Fe—O system at 1 atm calculated using the FToxid Database of the FactSage Thermochemical Software Package. One can see the different possible Fe—O compositions at various temperatures (FIG. 2) and oxygen partial pressures (FIG. 3).

In embodiments, the Fe is provided as one or more of an iron powder, atomized iron droplets, pieces or rods of iron or an iron crucible containing the source of lithium, the source of M, and the source of X during step b).

It is to be noted, as shown in FIG. 2, that the FeO phase used at high temperature is not stable under 564° C. and converts to $Fe^o$ and $Fe_3O_4$ at lower temperatures. Therefore, in the temperature range of the invention, the needed FeO is formed in-situ, in the presence of $Fe^o$, starting from an iron source containing $Fe_3O_4$, including those listed above as a source of M, when M is $Fe^{2+}$. In more specific embodiments, the iron source for the FeO is a natural mineral concentrate with a global $(Fe^{+2}, Fe^{+2})O_x$ composition in which x varies between 1.5 and ~1.

$FeO(s)/Fe_3O_4(s)$

In other embodiments, the reducing couple is $FeO(s)/Fe_3O_4(s)$, which has a $pO_2$ between $10^{-15}$ and $10^{-9}$ atm at a reaction temperature between 950 to 1350° C. When used in excess, this reducing couple provides slightly milder reducing conditions at equilibrium as can be seen on FIG. 1.

Again here, the needed FeO will be formed in-situ. The $Fe_3O_4(s)$ can be provided by iron oxide mineral or any iron oxide chemical.

$H_2/H_2O$ and $CO/CO_2$

Gas phases reducing couples, such as $H_2/H_2O$ and/or $CO/CO_2$, can be used in addition to the solid-solid reducing couple or with at least one element thereof. These gaseous reducing couples are also illustrated in FIG. 1. More specifically, in embodiments, the gas-gas reducing couple is $H_2/H_2O$ or $CO/CO_2$, which have $pO_2$ between $10^{-15}$ and $10^{-18}$ atm at a reaction temperature between 950 and 1400° C. These gas-gas reducing couples contribute to the provision of mild reducing conditions at equilibrium, to the reduction of any $Fe^{+3}$ present, and to the formation of $LiFePO_4$ in the melt.

In embodiments, the volumetric ratio of each of $H_2$ and $H_2O$ is between 5 and 95%.

In embodiments, both $H_2$ and $H_2O$ are provided to the reaction. In alternative embodiments, one of $H_2$ or $H_2O$ is provided and the other is generated in situ.

In embodiments, the volumetric ratio of each of CO and $CO_2$ is between 5 and 95%.

In embodiments, both CO and $CO_2$ are provided to the reaction. In alternative embodiments, one of CO or $CO_2$ is provided and the other is generated in situ.

In embodiments, these reducing couples are provided by syngaz, i.e. a mixture of $H_2$ and CO, generally also containing nitrogen and generally obtained by partial combustion of an hydrocarbon, such as natural gas, in air.

These gas-gas reducing couples can be used in combination with a solid-solid reducing couple, for example $Fe^o$/FeO. In other embodiments, they can be used in combination with only one component of the solid-solid reducing couple, preferably FeO and more preferably FeO formed from an iron mineral.

Absence of Strongly Reducing Moieties in Step b)

As explained above, the present process is based on the control (tuning) of the reducing conditions during reaction. In fact, "mild" reduction conditions, as defined above, are desired.

It will therefore be apparent to the skilled person that step b) should be performed in the absence of strongly reducing moieties. Herein, a strongly reducing moiety is an element or an oxide of an element, which when further oxidized, forms a reducing couple with an oxygen partial pressure at equilibrium (pO$_2$) below 10$^{-15}$ atm at the reaction temperature according to an Ellingham-Richardson diagram for oxides.

For example, as shown above, the couple C/CO is strongly reducing as it has a pO$_2$, for example, of 1.6×10$^{-15}$ atm at 1100° C. Indeed, when C is present during step b), the reducing condition can be so strong as to undesirably form FeP, Fe$_2$P, Fe$_3$P or Fe$_2$P$_2$O$_7$ (especially at high temperature and in certain of Li—Fe—P ratios, e.g. an excess of iron and Li deficiency). Therefore, the process should generally be carried in the absence of C or other strongly reducing moieties.

However, it should be noted that in some embodiments, the process of the invention can be carried out in the presence of some forms of C. More specifically, the reaction can occur in the presence of kinetically slow C, i.e. carbon in a form in which it reads slowly in the reaction conditions. This includes for example graphite, day graphite, or SIC. Indeed, this is possible when the desired reaction takes place over a short period of time and when the carbon oxidation kinetic is slower than that the reduction kinetics of the reducing used. This is shown in Example 2, where Fe$^0$/FeO is the reducing couple and C is present as graphite in the crucible used for the reaction, but does not act as an effective reducing couple. Therefore, in embodiments, step b) is carried out in the presence of kinetically slow C, such as graphite, that does not act as an effective reducing couple. Herein, "does not act as an effective reducing couple" does not mean that the kinetically slow C is devoid of reducing activity. It rather means that kinetically slow C may have some minor contribution to the reduction reaction, but that it is not part of the main reducing couple. Indeed, in such cases, the conditions would be too reducing as described above.

Steps c), d) and e)

The subsequent steps of the process of the invention involve solidifying the produced LiMXO$_4$ and isolating the LiMXO$_4$ from the reducing couple. These steps can performed in any order.

When using a gas-gas reducing couple, the reducing couple can easily be separated from the molten LiMXO$_4$ before solidification. This can be achieved, for example, by degassing the molten LiMXO$_4$.

In embodiments, the molten LiMXO$_4$ is isolated from the solid-solid reducing couple by decantation, filtration, or magnetic separation before solidification of the LiMXO$_4$.

Further, when an iron crucible, iron pellets or coarse iron particles or rods are used as the source of Fe$^0$; they can be easily separated from the melt.

Alternatively or complementarity, the isolation can also be made magnetically after solidification of the LiMXO$_4$ (step d)) and comminution (step e)), since the Fe$^0$ and Fe$_3$O$_4$ phases are magnetics and thus easy to separate in that manner.

In embodiments, the solidification is carried out by casting or atomization.

Step f)

In embodiments, the process of the invention can also comprise the step f) of removing extraneous impurities from the LiMXO$_4$.

As discussed below, these impurities can originate, for example from impurities contained in the starting materials or from the crucible. In particular, when a mineral is used as a starting material, typical extraneous impurities will include: Si, Al, Ca, Cr, Ni, and Co in various forms such as oxides, phosphates, etc., which are well known to the skilled person.

These impurities can be removed before or after steps d)/e), i.e. before or after solidification/comminution. They can be removed by different means, including phase separation, decantation, and filtration. Mineral concentration techniques involving e.g. floatation, magnetic separation or chemical treatment can also advantageously be used.

In particular, nickel and cobalt can be easily removed since, according to the Ellingham diagram of FIG. 1, because of the mild reducing conditions involved, these elements will be present as metallic phases.

Alternatively, these impurities can be removed from the starting materials. For example, Si can be eliminated before the synthesis by formation of gaseous SiF$_4$ by HF or HF formed in-situ from NH$_4$F in acidic solution.

Not al these impurities, especially when present in small quantities, will adversely affect the performances of a cathode to be made with the LiMXO$_4$. These inert impurities, including for example Si, Al, and/or Ca oxides, can simply be left in the product.

More Details on One Illustrative Embodiment

In an illustrative embodiments of the invention, the source of lithium and P$^{5+}$ is LiPO$_3$ and the source of M is a natural mineral concentrate with a global (Fe$^{+3}$, Fe$^{+2}$)O$_x$ composition in which x varies between 1.5 and about 1, while the reducing couple is Fe$^0$(s)/FeO(s). The source of iron metal is one of those described above, while the FeO is formed in situ from the mineral concentrate and the iron metal.

An excess of the mineral concentrate is used versus the amount needed for form stoichiometric LiFePO$_4$. Also, an excess of Fe$^0$ is used versus what is needed to reduce Fe$^{+3}$ from the mineral to FeO.

In these conditions, mild reducing conditions at equilibrium are obtained (as predicted by the Ellingham diagram). All LiPO$_3$ is consumed by the excess of FeO, while the remaining Fe$^0$ and FeO phases ensure the mild reducing conditions (pO$_2$). The reaction ultimately leads (at equilibrium) to molten LiFePO$_4$ in the presence of Fe$^0$ and FeO solid phases.

Without being so limited, it is suggested the mechanism at play may be:

wherein m≥0 (Fe$_2$O$_3$ excess versus LiPO$_3$ to form LiFePO$_4$ after reduction to Fe$^{+2}$)
wherein n≥0 (Fe$^0$ excess vs Fe$_2$O$_3$ to form FeO after reduction and excess Fe$^0$ after LiFePO$_4$ formation)
with possibly an electrochemical reaction between a reductant (Fe$^0$) and an oxidant (Fe$^{+3}$) in the presence of a molten ionic liquid, such as:

Followed by the acid-base reaction:

As long as Fe$^0$ and FeO still coexist after the synthesis (i.e. were present in excess), the mild reducing conditions (pO$_2$) will be maintained throughout the synthesis. However, in variants of this illustrative embodiment, a gas-gas reducing couple is used together with the Fe$^0$/FeO reducing couple or with a component thereof only, for example FeO.

Of note, it is known that the FeO stoichiometry at equilibrium with $Fe^o$ can vary slightly from 1 depending on the temperature and other parameters, but this does not affect significantly the principle of the present invention as the equilibrium is displaced towards FeO as it is subsequently consumed during the formation of $LiFePO_4$.

Apparatus for Making $LiMXO_4$

Figure 4:
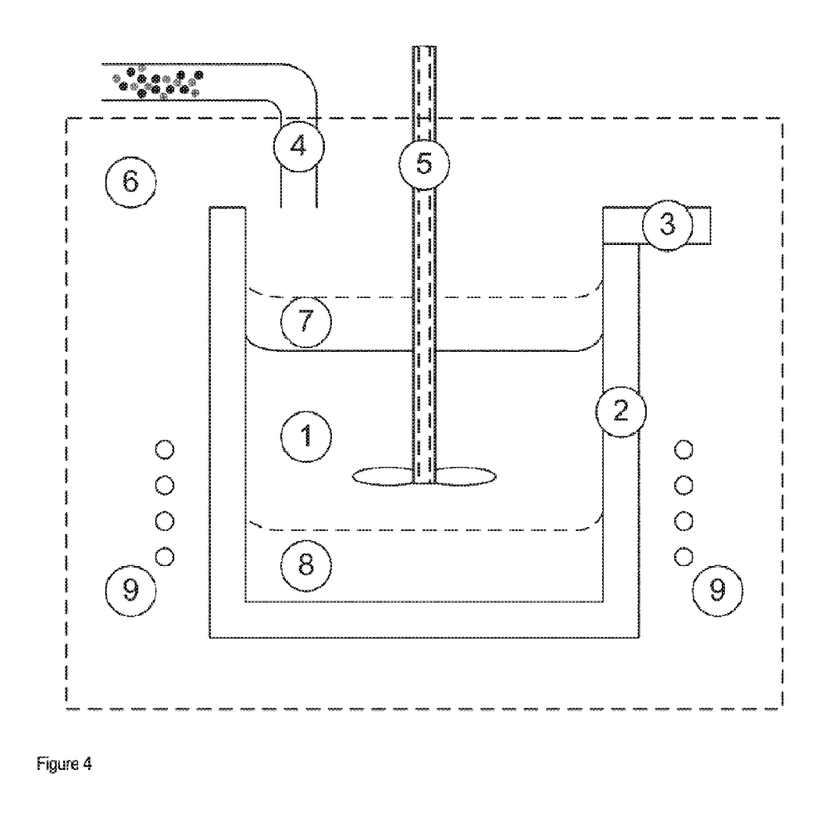
FIG. 4 is a schematic representation of an apparatus that can be used to carry out the process of the invention.

FIG. 4 is a schematic representation of an apparatus that can be used to carry out the process of the invention. Some of its different optional characteristics are shown.

More specifically, FIG. 4 shows a mixture or melt (1) of the source of lithium, the source of M, the source of X, optionally the pool used as a reaction media, and, in embodiments the reducing couple in a crucible (2) having a casting spout (3), optionally with filter.

The apparatus is provided with an inlet (4) for adding the source of lithium, the source of M, the source of X, and the reducing couple into the crucible. This inlet can optionally be gas assisted.

The apparatus is provided with means for stirring/degassing (5) mixture (1).

The apparatus is surrounded by a locally controlled non-oxidizing atmosphere (6) and heated by a heater (9). Heating can be resistive, induction, or combustion heating.

In embodiments of the process of the invention, after the reaction, a floating phase (7) and/or a liquid pool or heavy solid phase (8) may be present in the crucible in the presence of the melt. These phases (7) and (8) can also contain the solid-solid reducing couple.

The crucible may be made iron metal. In such embodiments, the iron in the crucible can if desired act as a source of iron metal for the $Fe^0/FeO$ reducing couple.

Other crucible material than iron are also possible. These including ceramics (e.g. stabilized zirconia, CaO, SIC, clay graphite). These may even include graphite, clay graphite or SIC when the reaction is carried in conditions of temperature, atmosphere and dwell time for which the C kinetic of reaction is slow enough vs the $Fe^o$ kinetic of reduction—(See Example 2).

Nickel crucibles are also possible since they are compatible with the $LiFePO_4$ melt at 1100° C. as shown in the Ellingham diagram of FIG. 1.

Melt-Solidified Product Comprising $LiMXO_4$

In another, related aspect of the invention, there is also provide a melt-solidified product comprising $LiMXO_4$, wherein M and X are as defined above.

In this product, the $LiMXO_4$ has an olivine crystalline structure. This crystalline structure is capable to insert and de-insert Li+ ion when used in a cathode of a lithium battery.

In embodiments, the $LiMXO_4$ melt-solidified product is produced by the above described process.

Figure 5:
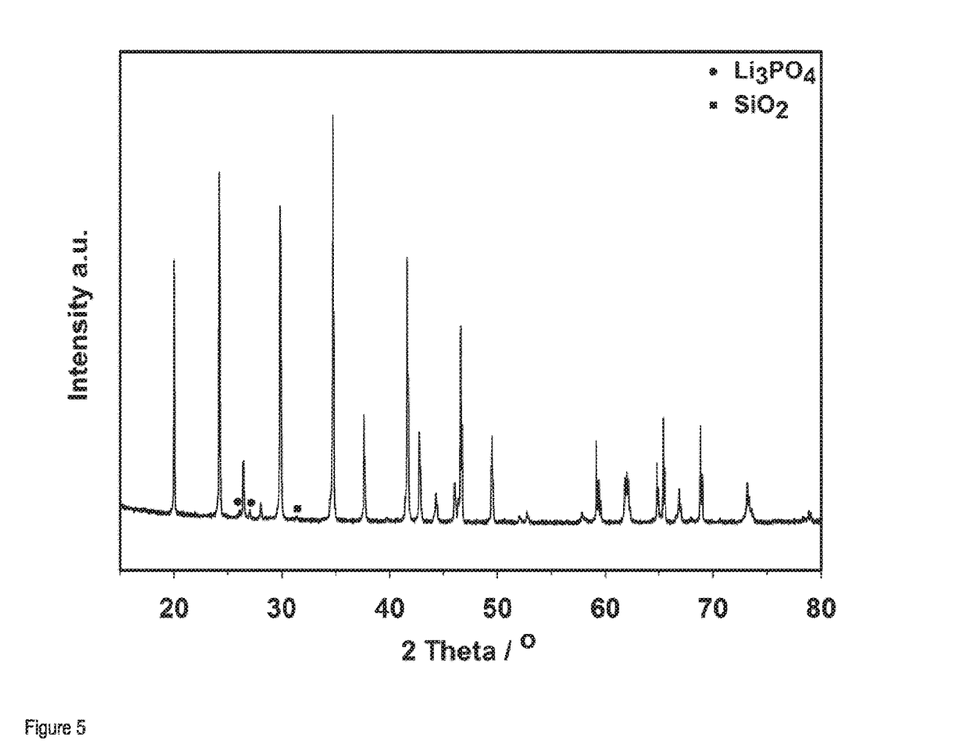
FIG. 5 shows the XRD (diffractometer with Co Kα radiation source) of the product obtained in Example 1.

In more specific embodiments, the $LiMXO_4$ is $LiFeXO_4$. In more specific embodiments, it is characterized by a XRD with peaks at the same locations as the main peaks in the XRD shown in FIG. 5. In more specific embodiments, it is characterized by a XRD as shown in FIG. 5.

Impurities that are Absent from the Melt-Solidified Product

Generally, and this is an advantage of the invention, the melt-solidified product will be free from one or more off-composition impurities.

Herein, "free from" (for example free from an impurity) means that the product comprises less than 1% molar ratio, preferably less than 0.5%, preferably less than 0.1% of said impurity, preferably less than 1000 ppm, and preferably than 500 ppm. In embodiments, the off-composition impurities in the product are undetectable by X-Ray Diffraction (XRD).

Herein, "off-composition impurities" are compounds consisting one or more Fe and/or Mn, Li, P, and O—except for $LiFePO_4$ (the product) and $Li_3PO_4$ and $Li_4P_2O_7$. These later compounds, especially Li3PO4, can be produced in the above process, but do not negatively affect the performances of a cathode made with the $LiFeXO_4$ melt-solidified product. Therefore, off-composition impurities include iron metal, manganese metal, lithium metal as well as oxides, phosphates, phosphides, etc. of one or more of these metals.

In embodiments, the $LiMXO_4$ is $LiFeXO_4$ and the melt-solidified product is free from one or more, preferably all, of the following off-composition impurities:

$Fe^o$, $Fe^{3+}$ phases, oxidized or reduced iron phosphides, such as $Fe_3P$, $Fe_2P$, and FeP, oxidized or reduced iron oxides, such as $Fe_2O_3$, and $Fe_3O_4$, oxidized or reduced iron phosphates, such as $Fe_2P_2O_7$, oxidized or reduced lithium phosphates, such as $LiPO_3$, except for minor amounts of $LiPO_3$, $Li_3PO_4$ and $Li_4P_2O_7$, oxidized or reduced lithium iron phosphate, such as $Li_3Fe_2(PO_4)$—except of course for $LiFePO_4$, oxidized or reduced lithium iron oxides, oxidized or reduced lithium iron phosphides.

In embodiments, the $LiMXO_4$ melt-solidified product comprises less than 5% molar ratio of $LiPO_4$. Indeed, minor amounts of inert $Li_3PO_4$ can be present, especially when introduced in excess to the reactant stoichiometric proportions as shown in some examples. In embodiment, the $LiFeXO_4$ melt-solidified product is free of $Li_3PO_4$.

In embodiments, the $LiMXO_4$ melt-solidified product comprises less than 5% molar ratio of $Li_4P_2O_7$. In embodiment, it is free of $Li_4P_2O_7$.

A minor phase of $LiPO_3$ can be desired in the $LiMXO_4$ melt-solidified product. For example, in embodiments, the $LiMXO_4$ melt-solidified product comprises 5% molar ratio of $LiPO_3$ or less. In embodiment, it is free of $LiPO_3$.

Deviation and Impurities that can be Present (or not) in the Melt-Solidified Product It should be understood that compounds showing minor deviation to $LiMXO_4$ stoichiometry (less than 0.1 atomic fraction) due to aliovalent element substitution on any crystalline site of the divine structure or inclusion dispersed in the crystal are part of the melt-solidified product of the invention.

Also, in embodiments, the $LiMXO_4$ melt-solidified product may or may not comprise extraneous impurities.

Herein. "extraneous impurities" are impurities comprising one or more metals other than ii and M, such as for example Si, Al, Ca, Cr, Ni, and Co. In particular, these elements can be any elements or compounds typically present in natural iron minerals as well-known of the skilled person. These elements can be of any form (metals (0 degree of oxidation), phosphate, oxides, etc.) either produced by or used in the above process (e.g. day graphite crucible) or originating from the mineral or any source that survived the process. A common extraneous impurity is $SiO_2$.

In embodiments, the $LiMXO_4$ melt-solidified product is free from such impurities either because they were not present in the starting materials or because they were removed as described above.

In alternative embodiments, especially if they are present in small amounts and/or are known not to negatively affect cathode performances, these impurities can be left in the $LiMXO_4$ melt-solidified product. In embodiments, these impurities, including Si, Al, and/or Ca oxides, are present in amounts of at most about 5% (w/w) and preferably at most about 1% (w/w).

Expected Advantages of the Invention

The present invention builds on the inherent advantages of the molten processes: rapidity, no reactant specificity, liquid phase reacting media, etc.

Furthermore, in embodiments, the process allows producing $LiMXO_4$ without off-composition impurities (as defined in the previous section) that results from the lack of control of the reducing conditions, temperature, and/or excess or deficiency of the initial reactant(s) used for the synthesis versus the final product stoichiometry.

The process is low cost, particularly when it uses, as a source of Iron, a low cost natural mineral, or concentrate, which can be of variable composition because the process is not reactant specific.

The process is simple and expected to be reproducible from batch to batch.

It is another advantage of the invention to be able to easily purify the $LiMXO_4$ melt for Ni or Co as explained above.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand process of referring individually to each separate value falling within the range, unless otherwise indicated herein, and each separate value is incorporated into the specification as if it were individually recited herein. All subsets of values within the ranges are also incorporated into the specification as if they were individually recited herein.

All process described herein can be performed in any suitable order unless otherwise indicated herein or otherwise dearly contradicted by context.

The use of any and all examples, or exemplary language (e.g., "such as") provided herein, is intended merely to better illuminate the invention and does not pose a Imitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENT

The present invention is illustrated in further details by the following non-limiting examples.

Example 1—$LiFePO_4$ Synthesis with Excesses of FeO and $Fe^o$ in an Iron Crucible $LiFePO_4$ was synthesized in the presence of an excess of FeO (provided be an Iron oxide mineral concentrate) and an excess FeO (provided as a powder and, possibly also by the iron crucible used) to control the $pO_2$ at equilibrium under the synthesis conditions.

More specifically, $LiFePO_4$ was synthesized, in an apparatus as shown in FIG. 4, using an Iron oxide mineral concentrate (in excess), iron powder (in excess) and $LiPO_3$ in an iron crucible. The mineral concentrate composition was: 65.77% wt Fe, 4.6% $SiO_2$, 0.19% $Al_2O_3$, 0.37% CaO and 0.28% MgO, including 6.88% FeO. The iron metal source was atomised $Fe^o$ from Atomet HP 1001. Crystalline $LiPO_3$ was obtained from. The weights of the reactants used were:

Mineral concentrate: 35.65 gr
Atomet Fe: 16.22 gr
$LiPO_3$: 48.46 gr

All reactants were sieved to less than 75 microns before mixing and the mixture was compacted in the iron crucible on top of 15.3 gr of $LiFePO_4$ compacted powder that acted as a reaction pool for the reactants after melting.

The crucible and its id were made of ion and without any direct contact with carbon. The synthesis was made under air but with a local non-oxidising atmosphere obtained by keeping the crucible in a larger graphite enclosure during the synthesis at 1100° C. The iron crucible was introduced in the furnace at 650° C. and taken out of the furnace after 3 hours at 1100° C. Solidification and coding occurred under a nitrogen atmosphere.

The final product bulk analysis by XRD after synthesis (FIG. 5) shows essentially $LiFePO_4$ as the main product with the presence of a small amount of $Li_3PO_4$ and $SiO_2$ coming from the starting mineral (more specifically from the starting pool and the mineral). Indeed, the $LiFePO_4$ used initially as a reacting pool for the synthesis was obtained from Clariant Canada, made by a solvent assisted synthesis, and contained a few % $Li_3PO_4$, which can explain its presence in the final product.

Some $Fe^o$ or $Fe_3O_4$ were found on the wall of the crucible or at the surface of the ingot. No FeO was found since this phase in not stable under 564° C.

To the inventor's knowledge, the $LiFePO_4$ produced is the best quality obtained either by melting or other synthesis techniques. As described above, the $LiFePO_4$ produced with prior art processes usually contains:

other off-composition such as $LiPO_3$, $Li_4P_2O_7$, or
reduced or deficient phases, such as $Fe_3P$, $Fe_2P$ or FeP, or $Fe_2P_2O_7$, or
oxidized phases such as $Fe_2O_3$ or $Li_3Fe_2(PO_4)_3$.

Such phases are absent from the present $LiFePO_4$ product.

It is believed that in this example, the absence of C as a dispersed reactant that could reduce any $Fe^{+3}$ (at a much more reductive $pO_2$ as shown on FIG. 1: about $10^{-13}$ $pO_2$ atm vs $10^{-18}$ $pO_2$ atm) allows thermodynamic control of the reducing condition by the $Fe^o/FeO$ couple still in excess after the synthesis.

Example 2—LiFePO$_4$ Synthesis Using a Galloni Crucible and a Grafoil Lid

LiFePO$_4$ was synthesized using the same products and procedure as Example 1, excerpt that the iron crucible and lid were replaced by a Galloni™ crucible and a Grafoil™ lid (both made of graphite). Furthermore, the reactants weights were:
Mineral concentrate: 30.04 gr
Atomet Fe: 13.67 gr
LiPO$_3$: 40.84 gr
as well as 13 gr of LiFePO$_4$ used as a reaction pool for the synthesis.

Two XRD analysis of the bulk ingot after solidification show essentially the same composition as for example 1 except that in a first analysis a possible attribution of some lines could be made to Fe$_3$P that could not be found in a second similar analysis pointing to the limit of detection of such small concentrations.

This result is interesting since it shows that carbon containing crucibles (such as graphite, clay graphite or SIC) could be used in large scale processes. This is believed to be possible because ion reduction and the pO$_2$ are controlled kinetically by the faster Fe°/FeO couple present in excess and not by the strongly reducing C/CO couple.

Example 3—LiFePO$_4$ Synthesis Using Pure Fe$_3$O$_4$

LiFePO$_4$ was synthesized using the same products and procedure as Example 1, except that the mineral concentrate was replaced by a pure FeO-rich iron oxide as found in some mineral composition (Fe$_3$O$_4$ from Bayoxide SLEA 99153). The reactant weights used were:
Fe$_3$O$_4$: 41.19 gr
Fe°: 14.47 gr
LiPO$_3$: 54.46 gr
as well as 13 gr of LiFePO$_4$ used as a reaction pool for the synthesis.

The LiFePO$_4$ product obtained was of the same purity as that of Example 1 (i.e. its XRD was almost identical).

Example 4—LiFePO$_4$ Synthesis Using Pure Fe$_2$O$_3$

LiFePO$_4$ was synthesized using the same products and procedure as Example 1, excerpt that the mineral concentrate was replaced by a pure Fe$^{+3}$ iron oxide (Fe$_2$O$_3$ from Bayoxide SLEA 99154). The reactant weights used were:
Fe$_2$O$_3$: 29.70 gr
Fe°: 15.40 gr
LiPO$_3$: 43.56 gr
as well as 13 gr of LiFePO$_4$ used as a reaction pool for the synthesis.

The LiFePO$_4$ product obtained was of the same purity as that of Example 1 (i.e. its XRD was almost identical).

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:
WO 02/27823 A1
US 2004/0151649 A1
WO 2005/062404 A1
WO 2013/177671 A1
C. W. Bale, P. Chartrand, S. A. Decterov, G. Eriksson, K. Hack, R. Ben Mahfoud, J. Melançon, A. D. Pelton and S. Petersen, "FactSage Thermochemical Software and Databases", Calphad Journal, 62, 189-228 (2002)
E. Jak, P. Hayes, A. Pelton, and S. Decterov (2007). Thermodynamic optimisation of the FeO—Fe$_2$O$_3$—SiO$_2$ (Fe—O—Si) system with FactSage. International Journal of Materials Research: Vol. 98, No. 9, pp. 847-854

"The thermodynamic modeling of the Fe—O system, calibrated on experimental data points, is presented in the following paper: C. W. Bale, E. Bélisle, P. Chartrand, S. A. Decterov, G. Eriksson, K. Hack, I.-H. Jung, Y.-B. Kang, J. Melançon, A. D. Pelton, C. Robelin and S. Petersen, "FactSage Thermochemical Software and Databases—Recent Developments", Calphad, 33 (2), 295-311 (2009).

The invention claimed is:

1. A process for producing LiMXO$_4$,
wherein M is a transition metal with a degree of oxidation of 2+ chosen from Fe$^{2+}$, Mn$^{2+}$ and mixtures thereof, unsubstituted or partially substituted on iron or manganese sites by one or more additional metal(s) with a degree of oxidation of 1+ to 5+, and X is P$^{5+}$, unsubstituted or partially substituted by an oxyanion forming element,
the process comprising the steps of:
a) providing a source of lithium, a source of M, and a source of X,
b) reacting the source of lithium, the source of M, and the source of X together:
  i. in a melted state at a reaction temperature between 900 to 1450° C.,
  ii. in the presence of an excess of:
    (A) a solid-solid reducing couple having an oxygen partial pressure at equilibrium (pO$_2$) comprised between 10$^{-8}$ and 10$^{-15}$ atm at said reaction temperature according to an Ellingham-Richardson diagram for oxides, or
    (B) one component of said solid-solid reducing couple together with a gas-gas reducing couple having an oxygen partial pressure at equilibrium (pO$_2$) comprised between 10$^{-8}$ and 10$^{-15}$ atm at said reaction temperature according to an Ellingham-Richardson diagram for oxides, and
  iii. under thermic equilibrium and thermodynamic equilibrium,
  thereby producing molten LiMXO$_4$,
c) isolating the LiMXO$_4$ from the reducing couple,
d) solidifying the LiMXO$_4$, and
wherein step c) is carried out before and/or after step d).

2. The process of claim 1, wherein the reaction temperature is between 950 and 1250° C.

3. The process of claim 1, wherein step b) is carried out in the presence of kinetically slow C.

4. The process of claim 1, wherein step b) is carried out in a crucible made of nickel metal, iron metal, magnesia, calcia, alumina or zirconia ceramics, graphite, clay graphite, or SiC.

5. The process of claim 1, wherein step b) is carried out in the absence of strongly reducing moieties, wherein a strongly reducing moiety is an element or an oxide of an element, which when further oxidized, forms a reducing couple with an oxygen partial pressure at equilibrium (PO$_2$) below 10$^{15}$ atm at the reaction temperature according to an Ellingham-Richardson diagram for oxides.

6. The process of claim 1, wherein, step b) is carried out in a pool of melted $LiMXO_4$ as a reaction media.

7. The process of claim 1, wherein the solid-solid reducing couple comprises a solid-solid $Fe^0/FeO$ reducing couple and the reaction temperature is between 950 to 1400° C.

8. The process of claim 1, wherein the solid-solid reducing couple comprises a solid-solid $FeO/Fe_3O_4$ reducing couple and the reaction temperature is between 950 to 1350° C.

9. The process of claim 7, wherein the FeO is produced in-situ from an iron source.

10. The process of claim 9, wherein the iron source is a natural mineral concentrate with a global $(Fe^{+3}, Fe^{+2})O_x$ composition in which x varies between 1.5 and 1.

11. The process of claim 1, wherein step b) carried out in the presence of an excess of (A) said solid-solid reducing couple.

12. The process of claim 11, wherein step b) is also carried out in the presence of an excess of a gas-gas reducing couple.

13. The process of claim 1, wherein step b) carried out in the presence of an excess of (B) one component of the solid-solid reducing couple together with the gas-gas reducing couple.

14. The process of claim 13, wherein the one component is FeO.

15. The process of claim 1, wherein the gas-gas reducing couple comprises $H_2/H_2O$ and the reaction temperature is between 950 to 1400° C.

16. The process of claim 1, wherein the gas-gas reducing couple comprises $CO/CO_2$ and the reaction temperature is between 950 to 1400° C.

17. The process of claim 15, wherein the reducing couple is syngas.

* * * * *